May 19, 1964     H. FRITZ     3,133,488
ADJUSTING DEVICE

Filed April 17, 1961     2 Sheets-Sheet 1

INVENTOR
Hubert Fritz

BY George H. Spencer
ATTORNEY

May 19, 1964   H. FRITZ   3,133,488
ADJUSTING DEVICE
Filed April 17, 1961   2 Sheets-Sheet 2

INVENTOR
Hubert Fritz
BY George H. Spencer
ATTORNEY

United States Patent Office 3,133,488
Patented May 19, 1964

3,133,488
ADJUSTING DEVICE
Hubert Fritz, Konstanz (Bodensee), Germany, assignor to Telefunken Patentverwertungs-G.m.b.H., Ulm (Danube), Germany
Filed Apr. 17, 1961, Ser. No. 103,526
Claims priority, application Germany Apr. 23, 1960
17 Claims. (Cl. 95—64)

The invention relates to a camera adjusting device particularly useful on cameras equipped with exchangeable lenses, and especially where these lenses are mounted on a lens indexing turret.

In such cameras the lenses arranged on a lens turret usually have different focal lengths to permit the taking of pictures of more or less remote objects, one of the lenses at a time being indexed into operating position depending upon the distance of the object or the aperture angle desired. Frequently an adjustment of the diaphragm opening is necessary after switching lenses because of differing photometric brightnesses of the individual lenses and for adjustment to the ambient brightness. This adjustment is made either by hand directly at the camera, by a photoelectric cell or by remote control. Herein lies the difficulty that at the moment when the operating lens is changed the newly selected lens aperture is not adjusted to the correct diaphragm opening. This results in a brief interval wherein the picture supplied by the camera is unusable. To avoid disturbances or damages due to too strong an exposure, for instance of a television pick-up tube whose photosensitive layer may, under certain circumstances, be damaged by a change of lenses, a correction has, therefore, to be made as soon as possible after the change of lenses in order to bring the diaphragm opening to the correct value.

In cameras with remote control of the diaphragm opening it is known to arrange so-called limit switches for this purpose at each lens, which switches turn off the motor when the limiting positions of the diaphragm have been reached. In such remote-control installations, however, the limit switches arranged at the lenses must be subjected to adjustment after each lens change. These drawbacks are eliminated by the camera device according to the invention.

In a camera, especially a television camera, with exchangeable lenses whose diaphragm openings may be varied by a motor, and especially in case of several lenses of differing focal lengths arranged on a turret head and having pairs of contacts for stopping the motor at the limiting positions of the diaphragms, the invention teaches means whereby the diaphragm openings may be varied by a motor through a gear train including gear components mounted on movable support means. These movable components are maintained in a neutral position between the contacts by one or several springs, whose resilience is greater than the deflective force of the support during normal driving of the diaphragm adjustment, but smaller than the deflective force occurring when a diaphragm limiting stop is reached. In this way, when the stop is reached the support moves out of its neutral position and actuates one of the two contacts, either directly or through one or several intervening members.

In a preferred embodiment of the invention, a drive pinion for the diaphragm-adjusting ring is connected with the motor through a gear train containing an idler journalled on a movable support. The idler is fastened on one end of a rocker arm whose other end lies between the contacts. Upon reaching a limiting stop, the idler is forced out of its neutral position, whereby the other end of the rocker arm is moved to actuate the appropriate contact against the force of one or several of said springs.

Additional objects and advantages of the present invention will become apparent upon consideration of the following description when taken in conjunction with the accompanying drawings in which.

Figure 1:
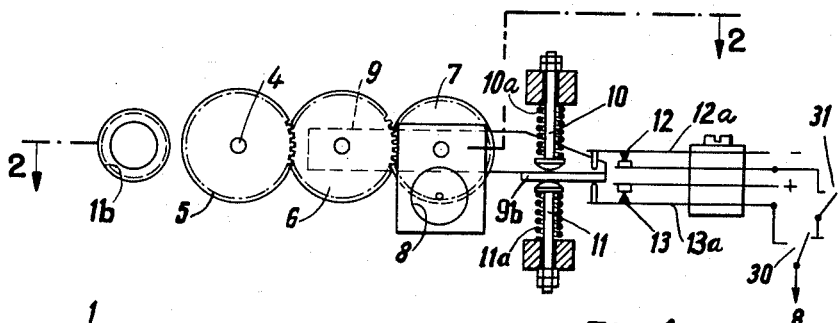
FIGURE 1 is a plan view of a diaphragm-adjustment device according to the present invention.
Figure 2:
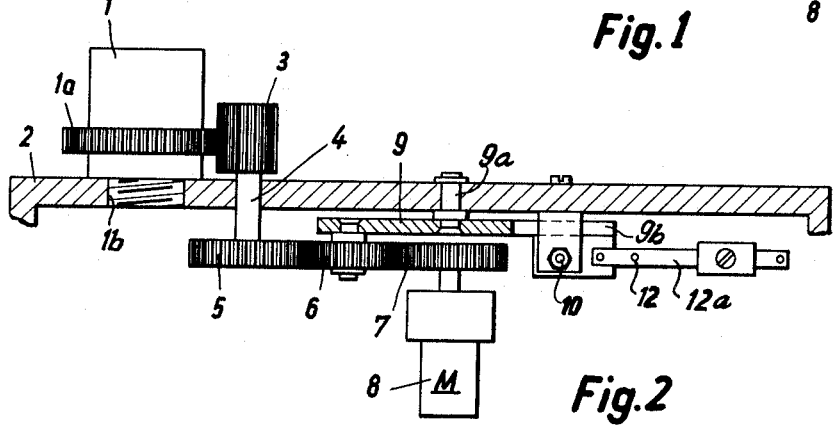
FIGURE 2 is a sectional view taken along line 2—2 of FIGURE 1.

FIGURES 1 and 2 show in plan view and in elevation view a diaphragm-adjusting gear train for a camera wherein a lens 1 is exchangeably mounted on the front wall of a camera 2. At the lens 1 a diaphragm-adjusting ring 1a is arranged which is driven by a pinion 3. The adjusting ring may be gear 1a or a rubber ring wherein the coupling to the pinion is effected by plastic deformation of the rubber ring. The gear wheel 3 includes a slip clutch (not shown) by which it is connected with a shaft 4 supported in the camera 2. This slip clutch serves to limit the torque on the gear 1a when the lens 1 is screwed into the camera housing 2 at threads 1b. The diaphragm is adjusted by a motor 8 (electric or spring actuated), preferably a remote-controlled motor coupled through gears 5, 6, 7 wherein the gear 5 mounted on the shaft 4 is connected with the driving gear 7 through an idler 6. The idler 6 is journalled on one end of a rocker arm 9 pivotally supported at 9a on the camera housing 2. This rocker arm is maintained in a neutral position by two spring-loaded abutments 10 and 11. The resilience of the springs 10a and 11a is selected greater than the deflective force of the adjacent end 9b of the rocker arm occurring in the normal course of operation, but smaller than the corresponding deflective force of the end 9b when a limiting position of the diaphragm is reached. If appropriately dimensioned, the contact spring arms 12a and 13a may replace the springs 10a and 11a. The abovementioned slip joint on the shaft 4 is so dimensioned as not to yield before actuation of the contacts 12 and 13. The end 9b of the rocker arm 9 when moved by the idler 6 actuates the contacts 12 and 13 which lie in the supply circuit of the motor 8 and are normally closed when the motor is operating.

With the motor 8 energized, the diaphragm ring 1a—unless deliberately switched off by external manual control or automatic control—rotates until the diaphragm ring reaches one of its stops. Thereupon the torque increases so until the rocker arm 9 is forced out of its neutral position, thereby compressing the spring 10a or 11a corresponding to the particular direction of rotation, and simultaneously the end 9b is deflected to open the terminal contact 12 or 13 connected with the motor 8. Since the resulting angular deflection of the rocker arm 9 may be relatively small and since the gear wheels are stopped by the switching off of the motor simultaneously with the forcing of the idler 6 out of its central position, the slight increase of the tooth-contact diameter on the gears, and thus of the distance between the cogs, of the gear wheels 5, 6, and 7 is of no consequence. When the motor 8 is actuated anew, as when changing the position of the diaphragm or the selection of a different lens, the circuit of the motor 8 is closed by a switch 30 or 31, depending upon the desired direction of rotation.

Figure 3:
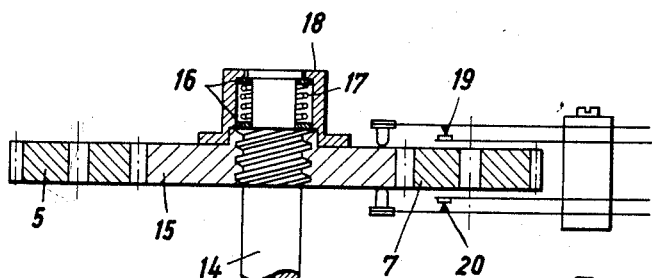
FIGURE 3 is a fragmentary view of a modification of the device according to FIGURE 1.

FIGURE 3 shows a further embodiment of the invention wherein the torque, increasing when the diaphragm ring strikes a stop, is utilized for displacing a gear wheel 15 replacing the idler 6 in FIGURES 1 and 2 and movably arranged on a threaded shaft 14, for example a highpitched thread, the shaft driving the diaphragm adjuster portion of the gear train. The gear wheel 15, corresponding essentially to the idler 6 in FIGURES 1 and 2, is hereby maintained during normal operation, in its neutral position by a calibrated spring 17 arranged between disks 16 within a sleeve 18. The terminal contacts 19 and 20, for switching off the motor 8 upon reaching the stops of the diaphragm-adjusting ring 1a, are normally closed. But, if upon reaching the stop, the torque exceeds a certain value, the wheel is displaced in its axial direction against the force of the spring 17, thereby opening the terminal contact 19 or 20 corresponding to the direction of the torque at the given time and thereby switching off the motor.

Figure 4:
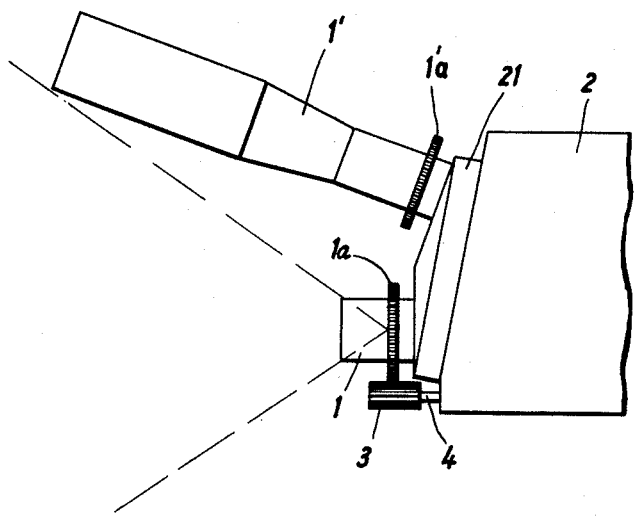
FIGURE 4 is an elevation view of a camera having a lens changing turret and equipped with a diaphragm-adjustment device according to the present invention.

FIGURE 4 shows an embodiment of a camera wherein exchangeable lenses 1 and 1' are arranged on a turret head 21. In this embodiment, it may be especially expedient to arrange the drive pinion 3 and to choose the direction of rotation of the turret head in such a way that, during a lens change, the diaphragm-adjusting ring is rotated by the pinion wheel 3 while motionless in the direction resulting in a decrease of the diaphragm opening.

Figure 5:
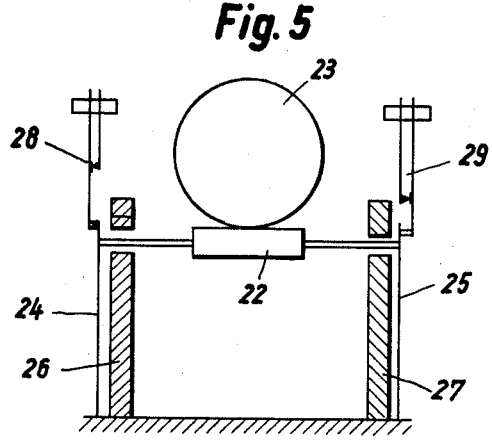
FIGURE 5 is a fragmentary view of still another modification of the device according to FIGURE 1.

Beside the embodiments shown in FIGURES 1 to 3, an actuation of the contacts may be achieved, according to FIGURE 5, also by an axial displacement dependent upon load of a worm-gear shaft 22 which, when the load of the worm wheel 23 is increased, is displaced against the action of two leaf springs 24 and 25 also serving as supports. Stationary stops 26 and 27 serve to limit this displacement. As in the other examples, here, too, the contacts 28 and 29 are actuated by displacement.

It will be understood that the above description of the present invention is susceptible to various modifications, changes, and adaptations, and the same are intended to be comprehended within the meaning and range of equivalents of the appended claims.

What is claimed is:

1. In a television camera having at least one selectible lens system, and each lens system having a diaphragm the opening of which is controlled by a motor coupled to the diaphragm adjuster, a device for stopping the motor when the adjuster has been driven thereby to one of two limiting positions, comprising, in combination: a gear train arranged on the camera frame and coupling the motor with the adjuster and including an idler gear; idler gear support means mounted on said frame and displaceably supporting the idler gear relative to the gear train; spring means yieldably urging said support means toward a neutral position with the idler gear meshed in the gear train, said spring means having sufficient force to maintain said neutral position when the gear train is moving the adjuster, but yielding to permit displacement from said neutral position when the adjuster stops after reaching one of said limiting positions; and switch means coupled to be actuated by the displacement of the idler gear to turn off the motor when the adjuster reaches a limiting position.

2. In a device as set forth in claim 1, said idler gear comprising a toothed spur gear interposed between two other spur gears of the train.

3. In a device as set forth in claim 2, said support means comprising a lever pivoted intermediate its ends to said frame and supporting the idler gear at one end, the support means engaging the switch means at its other end.

4. In a device as set forth in claim 3, said spring means comprising two coil springs disposed between the frame and said lever on opposite sides of the latter and each opposing displacement of the lever from said neutral position.

5. In a device as set forth in claim 4, said switch means comprising two switches respectively disposed on opposite sides of said other end of the lever, one switch being actuated at a time depending upon the direction of displacement of the other end.

6. In a device as set forth in claim 1, said idler comprising a worm gear driven by the motor and driving a worm wheel coupled to said actuator, said support means supporting the worm gear axially displaceably and in said neutral position and said switch means, being coupled to said support means for actuation upon axial displacement of the worm gear.

7. In a device as set forth in claim 1, said idler gear being mounted on a shaft coupled to drive said adjuster and maintained thereon by threaded engagement therewith, whereby when the idler gear rotates relatively to the shaft, it is displaced axially therealong, and said spring means opposing said relative rotation.

8. In a device as set forth in claim 7, said spring means comprising a coil spring disposed axially of the shaft and compressed between a radial face of said gear and an abutment connected with the shaft.

9. In a device as set forth in claim 7, said switch means comprising two switches disposed on opposite faces of said idler gear and having actuating means in contact therewith, one switch being actuated at a time depending on the direction of axial displacement of the gear on the shaft.

10. In a device as set forth in claim 1, friction slip-clutch means interposed between the gear train and said adjuster.

11. In a device as set forth in claim 1, said diaphragm adjuster comprising a ring frictionally coupled to said gear train.

12. In a device as set forth in claim 1, said diaphragm adjuster comprising a ring having an annular resilient rim frictionally coupled with said gear train.

13. In a device as set forth in claim 12, said resilient rim being substantially triangular in cross section.

14. In a device as set forth in claim 12, said resilient rim being trapezoidal in cross section.

15. In a device as set forth in claim 1, said switch means having spring-type actuator means, and said actuator means comprising said spring means for maintaining said neutral position.

16. In a camera having a plurality of lenses whose diaphragm openings may be set by a motor in circuit with two limit contacts for stopping the motor at corresponding end positions of the respective diaphragms, gear means interposed between said motor and a respective diaphragm and comprising, in combination: a movable support; a gear component arranged on said movable support; and spring means for maintaining said support in a central position between said limit contacts, the resilience of said movable means being greater than the deflective force exerted by said movable support during normal operation but less than the deflective force exerted by said movable support when an end position of a diaphragm has been reached, whereby when an end position of a diaphragm has been reached, said gear component moves out of its central position and actuates one of the two limit contacts.

17. In a television camera, the combination which comprises: a turret; a plurality of lenses arranged on said turret, each lens having a diaphragm adjusting device; motor means for setting the diaphragm adjusting device of a lens which is in operative position with respect to the camera; two limit switches in circuit with said motor for stopping the same when the diaphragm adjusting device of said lens in operative position reaches a corresponding end position; and gear means interposed between said motor and said adjusting device of said lens in operative position, said gear means including a pivoted lever-type support arranged on the camera, and cooperating with said limit switches, a gear component arranged on said movable support and adapted power-transmittingly to interconnect said motor and said diaphragm adjusting device, and spring means for maintaining said support in a central position between said limit switches, the resilience of said spring means being greater than the deflective force exerted by said support during normal operation but less than the deflective force exerted by said support when an end position of said diaphragm adjusting device has been reached, whereby when an end position of said diaphragm adjusting device has been reached, said gear component moves out of central position and actuates one of said limit contacts, thereby stopping said motor.

References Cited in the file of this patent

UNITED STATES PATENTS

| | | |
|---|---|---|
| 2,572,729 | Jackson et al. | Oct. 23, 1951 |
| 2,782,253 | Allanson | Feb. 19, 1957 |
| 2,854,885 | Robinson et al. | Oct. 7, 1958 |
| 2,885,937 | Donnay | May 12, 1959 |
| 3,034,400 | Biedermann et al. | May 15, 1962 |